Oct. 17, 1967   C. R. SELLEN ETAL   3,347,487
MEASURING TAPE DEVICE

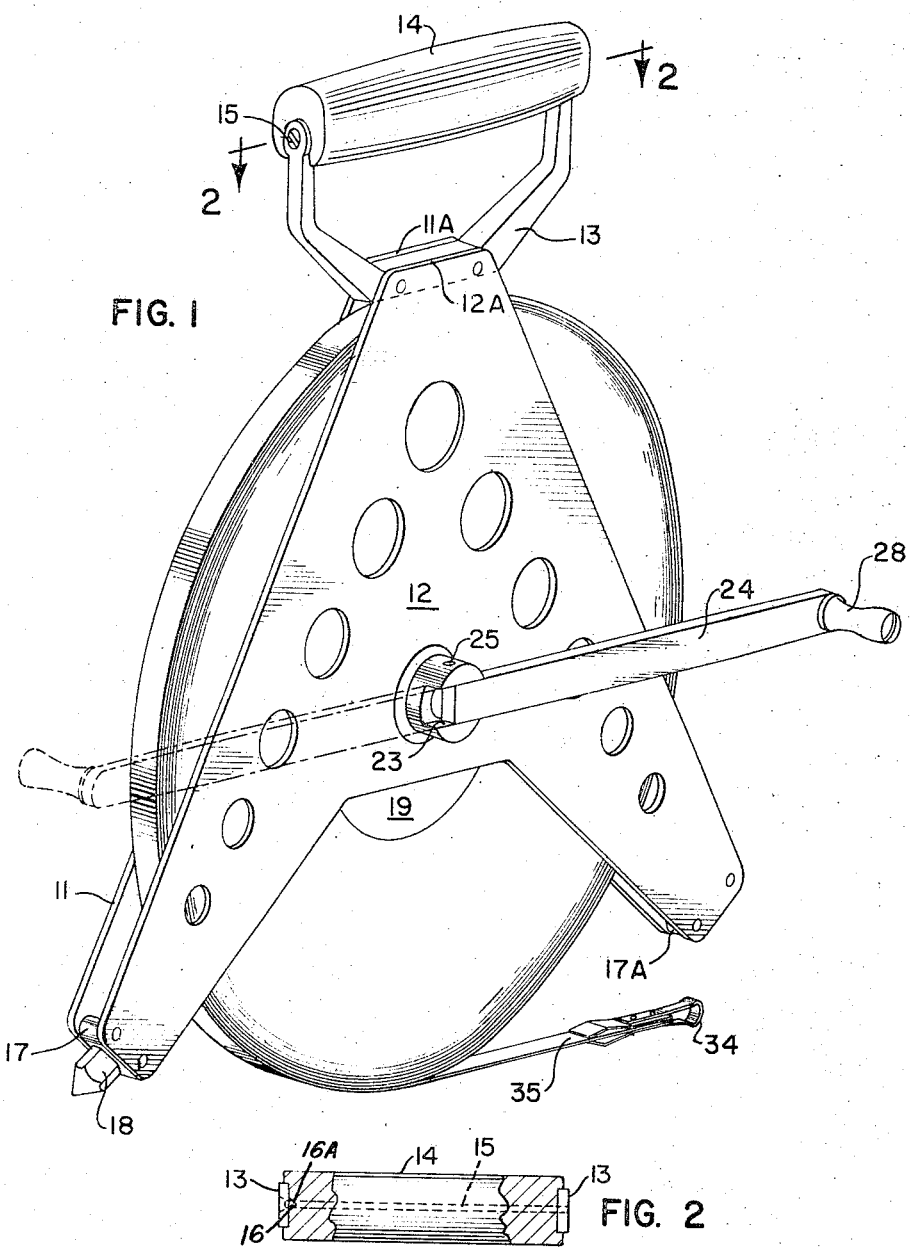

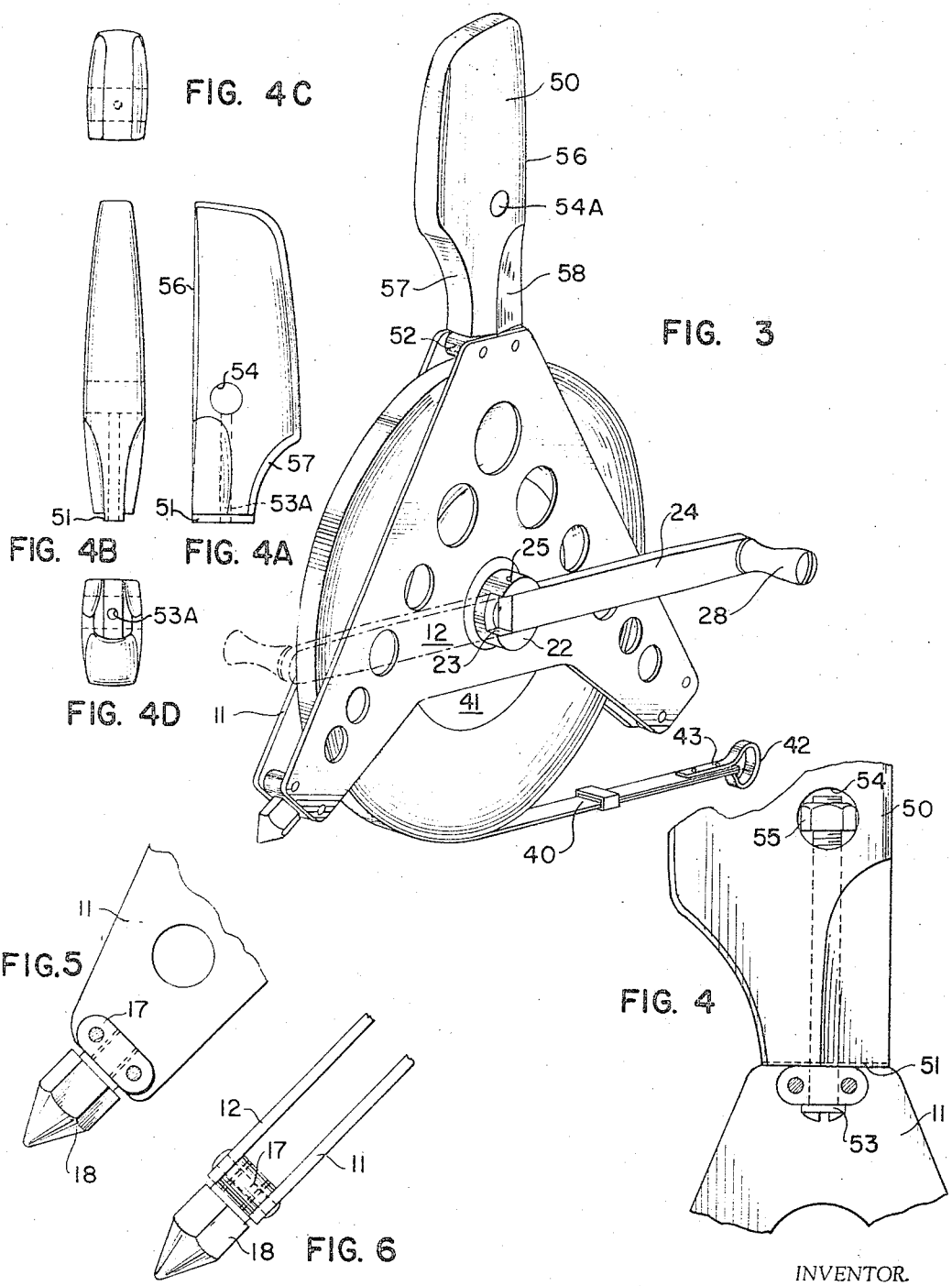

Filed Oct. 22, 1965   3 Sheets-Sheet 3

INVENTOR.
CARL R. SELLEN
FRANCESCO COLLURA

United States Patent Office 3,347,487
Patented Oct. 17, 1967

3,347,487
MEASURING TAPE DEVICE
Carl R. Sellen, Paramus, N.J., and Francesco Collura, New York, N.Y., assignors to Keuffel & Esser Company, Hoboken, N.J., a corporation of New Jersey
Filed Oct. 22, 1965, Ser. No. 501,225
12 Claims. (Cl. 242—84.8)

The present invention relates to measuring tapes and more particularly to the type of measuring tapes used by surveyors and the invention relates to the means for securing the inner end of the tape to a disc or reel and to the means to secure a tape case to the handle, and the specific handle structure used for manipulating the tape case.

Heretofore measuring tapes have been extensively used and provided with suitable handles but the weight of tape case and the shape thereof has not been entirely satisfactory since the measuring tapes must frequently be carried over rough terrain. Reduction of weight is of substantial importance and the shape of the handle is important in reducing fatigue of the linemen and to obtain the desired tension in the measuring tape at the time the measurement is taken.

An object of the present invention is to overcome the difficulties encountered with the use of the prior art measuring tapes.

Another object is to provide a tape case of minimum weight and of substantial structure to satisfactorily guide and protect the tape while simplifying the manipulation thereof.

A further object is to provide a handle structure which is readily adaptable for right hand or left hand operation while providing efficient means for producing tension and control of the measuring tape.

A further object is to provide a measuring tape which can readily be made into a form suitable for either right handed or left handed operators.

A still further object is to provide means on the tape reel or disc to selectively mount the inner ends of different types of measuring tapes.

Other and further objects will be apparent as the description proceeds and upon reference to the accompanying drawings wherein:

FIGURE 1 is a perspective of one form of measuring tape case.

FIGURE 2 is a partial section taken on line 2—2 of FIGURE 1.

FIGURES 2A and 2B are side and end elevations of the wooden handle.

FIGURE 3 is a perspective of another form of the measuring tape with a pistol grip manipulating handle.

FIGURE 4 is an enlarged fragmentary view showing the securement of the pistol grip handle secured to the apex of the tape case.

FIGURES 4A, 4B, 4C, and 4D are side elevation, top plan, and both end views, respectively, of the pistol grip handle.

FIGURE 5 is a fragmentary sectional view showing the screw attachment of the spur to the spacer.

FIGURE 6 is an edge view of the leg fragment of FIGURE 5.

Figure 7:
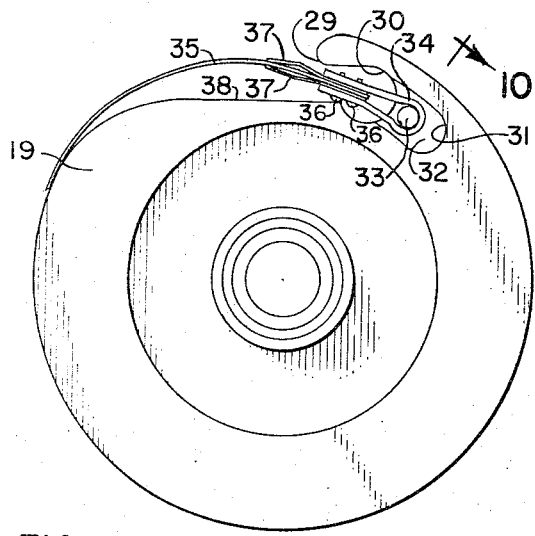
Figure 10:
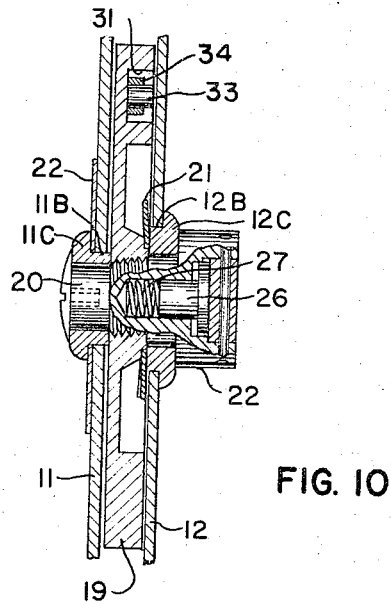

FIGURE 7 illustrates one form of the reel or disc with one type of measuring tape end structure removably secured to a projecting pin.

Figure 8:
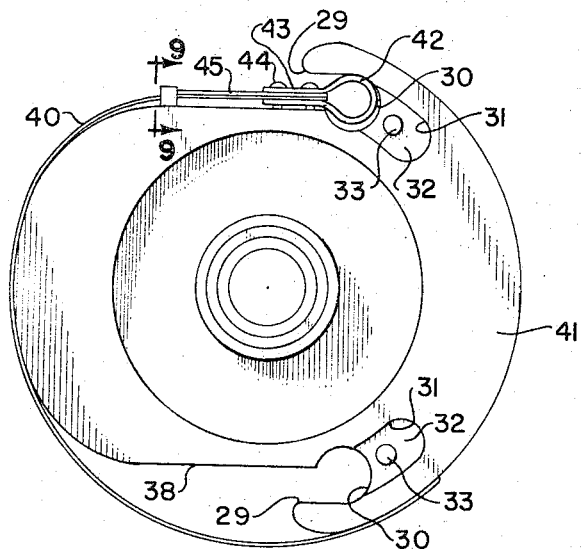

FIGURE 8 is a modified form of disc for reversible mounting showing a second form of measuring tape end-structure.

Figure 9:
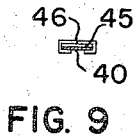

FIGURE 9 is a fragmentary section taken substantially on line 9—9 of FIGURE 8 showing the sliding attachment of the reinforcing strip to the measuring tape.

Referring more particularly to the drawings and to the modification shown in FIGURES 1 and 2, the measuring tape and case shown therein comprises a pair of A-shaped plates 11 and 12 arranged in side by side spaced parallel relation with the apex 11A of one plate and the apex 12A of the other plate being maintained in spaced relation by the bight portion of a U-shaped yoke 13 providing a spacer secured to the plates by suitable rivets or the like and mounted on the legs of the U-shaped yoke 13 is a handle 14 of flattened elliptical cross section with notches in the ends thereof receiving the free ends of the legs of the yoke 13.

The handle 14 is secured to the yoke by a bolt 15 extending freely through an aperture 15A in one leg of the yoke 13 and screw-threaded into a threaded aperture in the other leg. To additionally prevent rotation of the handle 14 about the bolt 15 a rib 16 is provided on the inner surface of at least one leg and is received in a corresponding groove 16A in the handle 14 with the handle 14 and the yoke 13 defining a D-handle by means of which the tape may be manipulated.

The handle 14 has approximately flat sides 14A and 14B over a major portion thereof between the convexly curved inner surface 14D and the convexly curved outer surface 14C whereby the convexly curved portions effectively fit into the palm and fingers of the closed hand of a lineman using the measuring tape. The approximately flat sides assure the lineman of control over the handle and thereby over the entire tape case for holding the tape case in proper position with respect to the terrain, a plumb bob, and a surveying instrument being used.

A first spacer 17 is positioned between the corresponding legs of the plates and secured thereto by suitable rivets or the like and such spacer is provided with a threaded aperture extending substantially radially which receives a stud on a spur 18 having a threaded shank whereby the tape case may be held in position by means of the handle 14 in one hand of the lineman while the spur 18 may engage a supporting surface such as a tree, the ground, or the like.

A second spacer 17A is provided between the corresponding other legs of the A-shaped plates and is of substantially the same construction to provide for selectively mounting the spur 18 therein.

A circular disc 19 of a thickness approximately the spacing between the plates and approximately the width of a measuring tape to be wound thereon is rotatably mounted centrally of said plates in cooperating apertures 11B and 12B which receive flanged bearing elements 11C, 12C, respectively. An axle 20 having stepped sections with an intermediate threaded section is threadedly received in a threaded bore in the hub of the disc 19.

A friction disc 21 mounted on the stepped shaft section reacts between the bearing 12C with the plate 12 and the disc 19 to produce a frictional retarding effect on the disc. A name plate 22 is mounted on the outer surface of the plate 11 by any suitable means between the flange of bearing 11C and plate 11.

The stepped axle 20 includes an enlarged head 22 having a channel 23 cut transversely therethrough receiving a lever 24 which is pivotally mounted on a pin 25 extending transversely of the axle 20. The lever 24 is retained in adjusted position by a mushroom stud 26 received in an eccentrically located stepped bore in the shaft 20 with a spring 27 urging the mushroom shaped stud against a flat surface of the lever 24 to retain the lever 24 in the full line position for winding a tape on the reel or to retain the lever 24 in the dotted line storage position while preventing winding and unwinding of the tape by the wind up handle 28 lying in the plane of the plates 11 and 12 and adapted to engage the edge of the plates. A second or wind up handle 28 is rotatably mounted on the free end of the lever 24 for controlling the winding and unwinding of the tape.

To attach the inner end of the tape on the reel 19, a recess opening to the outer periphery is provided including a wide mouth communicating with a shallow slot 29 communicating with a circular opening 30 which in turn communicates with a pocket 31 to provide the entire tape receiving recess for the inner end of the measuring tapes. The slot and the circular opening extend completely through the rim portion of the disc in an axial direction while the pocket is open on one side of the disc and closed by a wall 32 shown coincident with the other side of the disc from which wall a pin 33 projects toward the open side of the pocket for receiving the eye 34 of a measuring tape 35, the eye 34 being formed of a relatively narrow strap of metal folded back on itself and secured to the tape 35 by rivets 36 passing through the ends of the strap metal and also passing through reinforcing spring elements 37, 37 on each side of the tape 35 which prevent sharp bending and resulting fracture of the tape 35 at the ends of the strap metal defining the eye 34.

The rivets 36 are so positioned that a relatively sharp edge formed by the intersection of the substantially straight surface 38 of the disc 19 and the curved surface defining the circular opening 30 serve to additionally retain the eye 34 in operative position thereby reducing the strain on the pin 33 and assuring that the tape 35 always extends in a tangential direction to the plane of disc 19.

An alternative securement of a tape 40 to a similar disc 41, in which the parts of the recesses are identified by the same reference numerals, is shown to include an enlargement 42 on the inner end of the measuring tape formed from a yoke having an eye formed of metal which may be of circular cross section and tapering to strap portions 43, 43 which are secured to the tape 40 by suitable rivets 44 passing through the tape 40 and also passing through apertures in a leaf spring element 45 which extends away from the eye 42 a substantial distance. Secured to the free end of the leaf spring 45 is a clip member 46 having portions bent over the opposite face of the tape 40 but otherwise unattached to the tape 40 whereby bending may occur in both the leaf spring 45 and in the tape so that each supports the other and prevents sharp bending at the ends of the strap portions 43. The eye 42 has its outer diameter of a size which is greater than the spacing formed in the disc by the slot 29 thereby preventing removal of the eye 42 through the slot 29 in a tangential direction to the disc 19.

The reel or disc is made reversible by duplication of the recess with the mouth of the second recess opening in the opposite direction and substantially diametrically disposed as shown in FIGURE 8, the parts of such recess being identified by the same reference numerals.

The measuring tape of FIGURE 3 is similar to that of FIGURE 1, but is particularly designed for smaller sized reels; but similar parts are identified by the same reference numerals to avoid duplication. A pistol grip handle 50 includes a relatively short tongue 51 which is received between the apices 11A and 12A of the plates 11 and 12 and the free end of such tongue is adjacent a spacer 52 secured to the apices of the plates 11 and 12 by suitable rivets. The free end of the tongue 51 is received in the space between the inner surfaces of the apex portions of the plates 11 and 12 which extend outwardly of the outer surface of the spacer 52 and the handle 50 is secured by a bolt 53 extending axially through an aperture in spacer 52 and through an aligned aperture 53A in the handle 50 which communicates with a transversely extending circular nut receiving aperture 54. A nut 55 positioned in the transversely extending aperture 54 threadedly receives the screw 53 fixing the handle 50 to the tape case with the tongue 51 wedged between the plates 11 and 12 and the shoulders at the base of the tongue engaging the flattened apex edges of the plates 11 and 12 preventing rotation of the handle 50 while securely connecting the handle to the tape case for manipulation by the lineman. A plug 54A at each end of the nut receiving aperture provides a smooth, neat outer appearance.

The handle 50 includes a substantially straight upper surface 56 merging with one of the side edges of the plates 11 and 12. The handle includes an enlargement intermediate the ends thereof tapering with a smooth concave curve 57 opposite the edge 56 toward the tongue 51 and merging with the other edges of the plates. The curved configuration 57 is adapted to be snugly engaged by the trigger finger of the user. The handle 50 is provided with a thumb receiving groove 58 on each side thereof adjacent the substantially straight edge 56 whereby a secure grip can be obtained by the thumb engaging the groove 58, the forefinger engaging the concave curve 57 and the palm engaging the straight edge 56 for accurately manipulating the tape case, while the tape may be wound by means of the handle 28. The configuration of the handle permits gripping thereof in many different ways while maintaining complete control of the tape case.

It will thus be seen that applicants have provided an effective measuring tape adaptable for use where accuracy is required with suitable means to prevent winding and unwinding when desired while permitting right and left hand operation.

It will be apparent that changes may be made within the spirit and scope of the invention as defined by a valid scope of the claims.

What is claimed is:

1. A measuring tape comprising a pair of A-shaped plates arranged in side-by-side spaced parallel relation with the apex and legs of each plate registering with the apex and legs of the other plate defining a tape case, a spacer mounted between the plates at the apex and at each leg, a first handle mounted on the spacer at said apex, a spur fixed on the spacer on one leg and projecting outwardly therefrom to support the tape case, a circular disc of a thickness approximately the width of a measuring tape to be wound thereon, said disc being rotatably mounted centrally of said plates, said disc having a recess including a wide mouth communicating with a shallow slot communicating with a circular opening through an outer peripheral portion of the disc, said recess also including an open side pocket communicating with said circular opening, said pocket being defined in part by a wall coincident with one side of the disc, a pin extending axially from said wall toward the open side of the pocket for reception within a small eye on the inner end of a measuring tape whereby a measuring tape may be attached to said pin with the pin passing through the eye or a measuring tape having an enlargement on the inner end may be mounted with the enlargement in the circular opening in communication with said slot thereby providing for selective mounting of measuring tapes, the portion of said recess defining the shallow slot effectively maintaining the measuring tape substantially tangential to the reel preventing winding the tape in the wrong direction.

2. The invention according to claim 1 in which the rotatable mounting of said disc includes an axle, a lever pivotally mounted on said axle and disc on an axis transverse to said axle, a second handle extending outwardly from said lever whereby said lever may be placed in operative position for winding and unwinding the tape with the second handle extending away from said tape case, said second handle being movable with said lever about said transverse axis to locate said second handle across an edge of said tape case preventing rotation of said disc.

3. A tape case comprising a pair of A-shaped plates arranged in spaced relation, a handle having a tongue approximately the thickness of the spacing of said plates, a spacer fixedly mounted at the apex between said plates and having an aperture therethrough extending substantially in a direction bisecting the angle between the legs of the plates, said handle having one edge surface substantially straight and merging with one of the edges of each of said plates, said handle including an enlargement intermediate the ends thereof away from said plates and including a smooth curve on the other edge adjacent said plates for snug engagement by the trigger finger of the user, said handle having a thumb receiving groove opening to said straight edge surface and toward said plates whereby the user can obtain an effective tensile grip between the trigger finger and the thumb to effectively apply force on the tape case.

4. A tape case comprising a pair of plates arranged in spaced relation, a handle, a spacer fixedly mounted between said plates and having an aperture therethrough, said handle having one edge surface substantially straight and merging with one of the edges of each of said plates, said handle including an enlargement intermediate the ends thereof including a smooth curve on the other edge adjacent said plates for snug engagement by the trigger finger of the user, said handle having a thumb receiving groove opening to said straight edge surface and toward said plates whereby the user can obtain an effective tensile grip between the trigger fingers and the thumb to effectively apply force on the tape case.

5. The invention according to claim 4 in which a bolt extends through the spacer and into the handle and nut means are provided to maintain the handle in position.

6. A reel for selective right-hand or left-hand operation within a tape case comprising a generally circular disc of a thickness approximately the width of a tape, said disc being provided with a recess through the outer peripheral portion of the rim including a mouth communicating with a shallow slot communicating with an enlarged opening adjacent the rim, said enlarged opening being adapted to receive an enlargement on the end of a tape for effectively retaining the tape having an enlargement at one end with the height of the enlargement being greater than the clearance between the top and bottom of the slot, said disc being provided with a pocket adjacent the periphery in communication with said enlarged opening and having a wall coincident with one side of the disc, a pin extending axially away from said wall of said pocket for reception within a small eye of a measuring tape whereby the measuring tape may be attachable to said pin with the pin passing through the eye or a measuring tape may be attached with an enlargement in the enlarged opening.

7. The invention according to claim 6 in which the reel in provided with two recesses with the slots thereof extending in opposite circumferential directions whereby a tape may be mounted for right or left hand winding without reversal of the reel.

8. A measuring tape comprising a pair of A-shaped plates arranged in side-by-side spaced parallel relation with the apex and legs of each plate registering with the apex and legs of the other plate defining a tape case, a spacer mounted between the plates at the apex and at each leg, a handle mounted on the spacer at said apex, a circular disc of a thickness approximately the width of a measuring tape to be wound thereon, said disc being rotatably mounted centrally of said plates, means to attach a measuring tape to said disc, said handle including opposed side surfaces of substantial dimension in the plane of the plates, and having rounded edges and at least one edge surface of convex curvature in both directions whereby a user can effectively grip the handle and maintain the tape case in an accurate position relative to the terrain on which it is used and relative to a plumb bob and surveying instrument.

9. A measuring tape comprising a pair of A-shaped plates arranged in side-by-side spaced parallel relation with the apex and legs of each plate registering with the apex and legs of the other plate defining a tape case, a spacer mounted between the plates at the apex and at each leg, a first handle mounted on the spacer at said apex, a circular disc of a thickness approximately the width of a measuring tape to be wound thereon, said disc being rotatably mounted centrally of said plates, said spacer at the apex including diverging legs forming a yoke, said handle being secured by its ends to the free ends of the legs of the yoke, said handle having opposed generally flat surfaces in the planes of said plates and having substantial width greater than the thickness whereby a user can grip the handle and have complete control of the measuring tape and case.

10. A measuring tape comprising a pair of A-shaped plates arranged in side-by-side spaced parallel relation with the apex and legs of each plate registering with the apex and legs of the other plate defining a tape case, a spacer mounted between the plates at the apex and at each leg, a first handle mounted on the spacer at said apex, a circular disc of a thickness approximately the width of a measuring tape to be wound thereon, said disc being rotatably mounted centrally of said plates, said handle having a body having a wide intermediate portion tapering toward each end, one end being secured to the spacer at the apex and the one edge being substantially straight with the other edge portion adjacent the spacer being provided with a concave curve merging with the adjacent edges of the plates for engagement by the trigger finger of the user and the other edge portion of the sides of the handle adjacent the spacer and adjacent the generally straight edge being provided with opposed grooves for engagement by the fingers of the user to maintain a secure grip on the handle.

11. The invention according to claim 8 in which positive interengaging means prevent relative rotation between said handle and said tape case.

12. The invention according to claim 8 in which the spacer includes a pair of legs providing a yoke and the handle is mounted between the legs, and rib and groove means are provided between at least one leg and said handle to prevent rotation of said handle relative to said tape case.

References Cited
UNITED STATES PATENTS

| | | | |
|---|---|---|---|
| 475,470 | 5/1892 | Roe | 242—84.8 |
| 645,263 | 3/1900 | Keuffel | 242—84.8 |
| 2,268,178 | 12/1941 | Boisture | 242—84.8 |
| 2,634,919 | 4/1953 | Strassler. | |
| 2,639,867 | 5/1953 | Lindsay | 242—74 |
| 2,683,000 | 7/1954 | Beiderwell | 242—96 |

FRANK J. COHEN, *Primary Examiner.*

N. L. MINTZ, *Assistant Examiner.*